United States Patent [19]

Reiss et al.

[11] Patent Number: 4,910,380

[45] Date of Patent: Mar. 20, 1990

[54] VEHICLE WINDOW WITH BLACK OBSCURATION BAND INCORPORATING A BLACK ELECTRICALLY CONDUCTIVE COATING-DEPOSITED HEATING ELEMENT

[75] Inventors: Jürgen Reiss, Bochum; Wolfgang Zernial, Gelsenkirchen, both of Fed. Rep. of Germany

[73] Assignee: Flachglass Aktiengesellschaft, Furth, Fed. Rep. of Germany

[21] Appl. No.: 155,269

[22] Filed: Feb. 12, 1988

[30] Foreign Application Priority Data

Jul. 21, 1987 [DE] Fed. Rep. of Germany ....... 3724014

[51] Int. Cl.⁴ .......................... H05B 3/26; E06B 7/12; A47L 1/16; H01C 7/00
[52] U.S. Cl. ................................. 219/203; 15/250.05; 52/171; 219/522; 219/543; 219/547; 338/308
[58] Field of Search ............... 219/203, 219, 202, 522, 219/547, 543; 338/308, 309; 52/171; 15/250.05

[56] References Cited

U.S. PATENT DOCUMENTS

| 4,004,126 | 1/1977 | Boaz | 219/203 |
| 4,109,044 | 8/1978 | Marriott | 219/522 |
| 4,109,133 | 8/1978 | Hanle et al. | 219/203 |
| 4,315,134 | 2/1982 | Matsuzaki et al. | 219/203 |
| 4,373,130 | 2/1983 | Krasborn et al. | 219/522 X |
| 4,378,484 | 3/1983 | Kunert | 219/203 |
| 4,388,522 | 6/1983 | Boaz | 219/522 |
| 4,415,196 | 11/1983 | Baurn et al. | 219/203 X |
| 4,453,669 | 6/1984 | Karla et al. | 219/203 X |
| 4,721,845 | 1/1988 | Kunert et al. | 219/543 X |
| 4,725,710 | 2/1988 | Ramus et al. | 219/203 |

FOREIGN PATENT DOCUMENTS 50-9805 4/1975 Japan .

Primary Examiner—Anthony Bartis
Attorney, Agent, or Firm—Herbert Dubno; Andrew Wilford

[57] ABSTRACT

A motor-vehicle window comprises a glass pane having an outer edge and a peripheral black obscuration band extending around the pane edge and leaving a central portion of the pane clear and unobstructed. This band is at least partially formed of a coating-deposited black conductor capable of generating heat when an electric current is passed through it. Thus an electrical current can be passed through the conductor to heat at least a portion of the pane at the obscuration band. The conductor may be positioned side-by-side with the band, disposed in a recess in the band or overlie the band. The conductor may define a heated wiper rest zone on the window.

9 Claims, 1 Drawing Sheet

VEHICLE WINDOW WITH BLACK OBSCURATION BAND INCORPORATING A BLACK ELECTRICALLY CONDUCTIVE COATING-DEPOSITED HEATING ELEMENT

FIELD OF THE INVENTION

Our present invention relates to a motor-vehicle window pane and, more particularly, to a motor-vehicle window with opaque (black) obscuration bands (e.g. a window light masking frame) and an electrically conducting element.

BACKGROUND OF THE INVENTION

A motor-vehicle window can have an applied opacifying obscuration band made of a nonconducting coating material and also can have at least one electrically conducting element made of a conducting layer material located near the obscuration band. The obscuration band can also be an adhesive strip, e.g. for receiving an adhesive for direct glazing or for receiving another structural element.

The electrical conducting element on a motor-vehicle glass pane can be used for a variety of functions.

It can be an electric-current distributing strip or a connecting element for a heater element located in the vision field of the motor-vehicle glass pane or it can be used as an antenna conductor or both and can even comprise a plurality of layers.

It can also be used for electrical applications in or on the window. These applications include dimmable or fixed illumination, electrically variable-level reflector or mirror. It can also be used as a connecting element of an indicator device, as a conductive strip for thermal glazing or vitrification, as a heating element of the enclosed window-washer unit, as a deicer conductor sunk in the motor-vehicle window or as an alarm conductor or as a combination thereof.

The nonconducting layer which forms the more or less wide opacifying masking band comprises for example a burned-in lacquer, a frit or an enamel (see for example Japanese Patent document JA No. 50-9805).

It is understood that the motor-vehicle window can be a single pane safety glass or sandwich or composite safety glass.

With a motor-vehicle glass pane made from sandwiched safety glass the opacifying masking band and the electrically conductive element can be provided on the inner surface of one of the two glass panes sandwiched together.

In the known motor-vehicle safety glass the electrically conductive element can comprise a conductive layer material such as a burned-in lacquer, a frit, or an enamel (JA No. 50-9805) separate from the usual masking strip. The electrically conductive element has a more or less metallic color. Electrically conductive elements such as wires, metallic strips or plates have also been used in windows heretofore. However they all interfere with the optical properties of the assembly and demand in addition expensive masking steps, chiefly in the form of additional layers for these otherwise highly visible electrically conductive elements.

OBJECTS OF THE INVENTION

It is an object of our invention to provide an improved motor vehicle window with an obscuration band and at least one electrically conducting element which avoids the above difficulties.

It is also an object of our invention to provide an improved motor vehicle window, especially a motor vehicle window, with a obscuration band and at least one electrically conducting element, for which additional masking steps for the electrical conductive elements are not required and, as a result, manufacturing processes connected therewith used to make the motor-vehicle window are more economical.

SUMMARY OF THE INVENTION

These objects and others which will become more readily apparent hereinafter are attained in accordance with our invention in a motor-vehicle window with an obscuration band made of a nonconducting layer material and with at least one electrically conducting element made of a conducting layer material in the vicinity of the obscuration band.

According to our invention the electrically conducting element comprises a coating-deposited black conductor made from a conducting black material and included in the obscuration band or replacing (i.e. forming) the obscuration band. "Included" means in this application incorporated and integrated optically. "Replaced" means that a segment is absent from the obscuration band and is replaced by the coating-deposited black conductor.

The invention is based on our discovery that a conductive layer material in the form of a burned-in lacquer, a frit, or an enamel can also be black and of course by adding or mixing in an appropriate coloring material (black pigment) or by selection of a correspondingly conductive substance. The use of a conducting coating-deposited black material for the conductive element, i.e. its structure as a coating-deposited black conductor, allows the heating of the conductive element in the obscuration band without disturbing the appearance of the assembly. Because of that the manufacturing expense can be reduced considerably for the window. One can however also replace the entire obscuration band by the coating-deposited black conductor and use it for an electrical function, e.g. for edge heating or for glazing or removal of a glazing seal along the edge.

In particular there are several possible structures and forms for our invention. Thus the coating-deposited black conductor can be band like, strip like or also simply flat. The heating in the obscuration band can also be effected so that the coating-deposited black conductor and the obscuration band are positioned side-by-side.

Another feature of the invention provides an assembly in which the coating-deposited black conductor and the obscuration band are a single layer whole. In another form of our invention the arrangement is such that the obscuration band covers or underlies the coating-deposited black conductor.

The described steps or features lead to a particularly simple structure in a motor-vehicle window having a special function, namely with a motor-vehicle window which is designed with a heated window-wiper unit in which the window has a peripheral obscuration band and a heated conductor in the vicinity of the window-wiper unit.

According to this aspect of our invention the heated conductor is constructed as a coating-deposited black conductor which is made of a conducting coating-deposited black material and which is included in the obscuration band in the vicinity of the window wiper unit or replaces it.

One can provide the coating-deposited black conductor at both ends with at least one contact or contact device so that in a simple way the heating of the motor-vehicle window can be performed in the vicinity of the window wiper unit.

In this embodiment another feature of the invention is that the obscuration band which is also constructed as a coating-deposited black conductor framing the motor-vehicle window is connected to the coating-deposited black conductor in the vicinity of the window-wiper unit directly or with a conductionbreaking gap interposed. Here also this smaller coating-deposited black conductor can be used as a heated conductor, for example to be heated around the edge of the motor-vehicle window to allow a thermal glazing.

In the scope of our invention it is also possible to omit the conduction-breaking gap so that the coating-deposited black conductor located in the vicinity of the window-wiper unit and the coating-deposited black conductor connected to it are heatable current distributors. The coating-deposited black conductor need not, particularly in this embodiment, necessarily have the width which the obscuration band might otherwise have.

The assembly of the coating-deposited black conductor can be bounded on at least one long side by a obscuration band made from a nonconducting layer material so that the obscuration band is widened.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
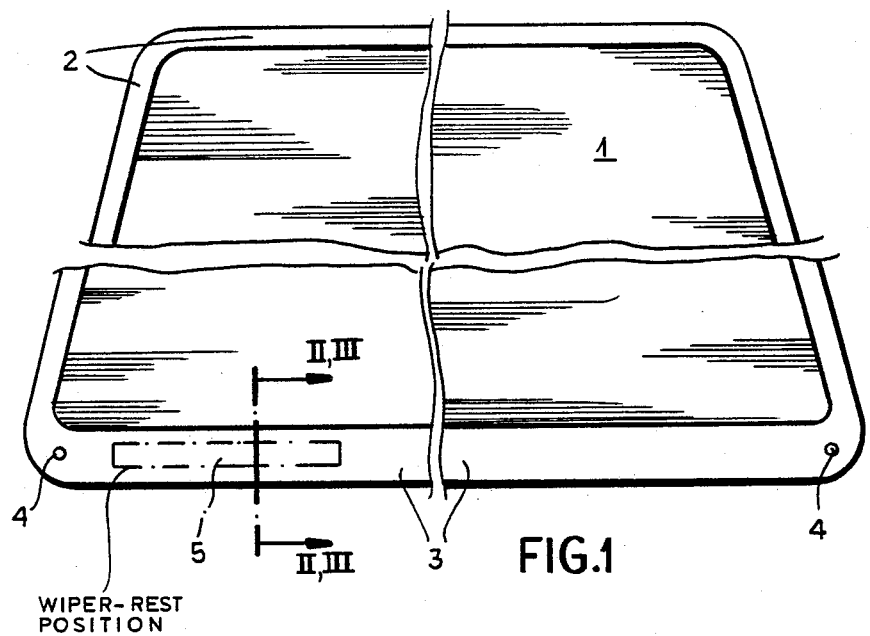
FIG. 1 is an elevational view of one embodiment of a motor-vehicle window according to our invention.

The motor-vehicle window shown in the drawing is designed for a motor vehicle with a heatable window-wiper unit. The wiper is intended to rest on the zone 5.

The window has a peripheral obscuration band 2. It is heatable in the vicinity of the window-wiper unit. In addition, a heater element comprising a coating-deposited black conductor 3 made of a conducting coating-deposited black material is provided.

Figures 2, 3, 4, 5:
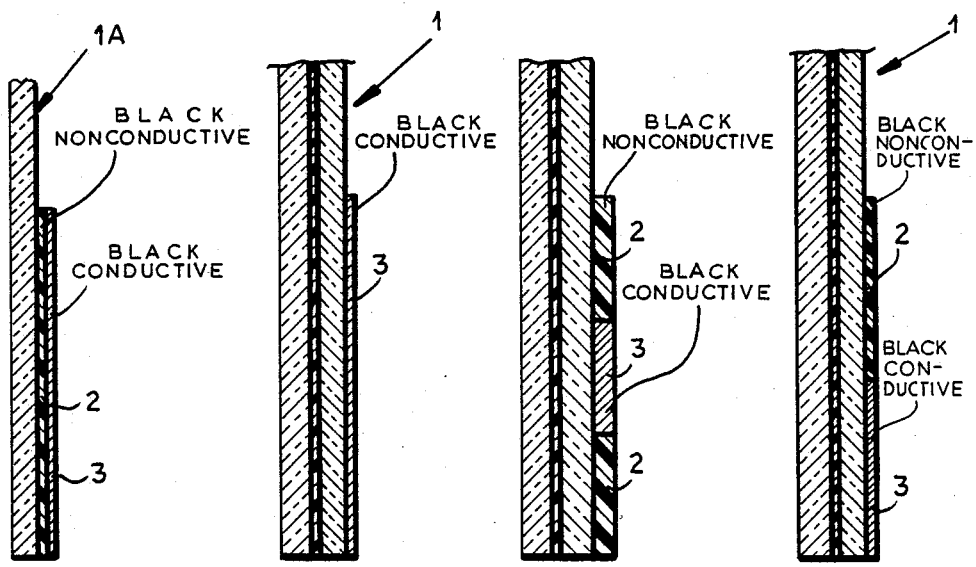
FIG. 2 is a cross-sectional view of the window taken along the section line II—II in FIG. 1 and drawn to a larger scale.
FIG. 3 is a cross sectional view of another embodiment of a window according to our invention taken along the same section line III—III of FIG. 1.
FIG. 4 is a similar section of a third embodiment.
FIG. 5 is a similar section of a fourth embodiment

In the embodiment according to FIGS. 1 and 2 it replaces the obscuration band.

In the embodiment according to FIG. 3 it is included in the obscuration band inasmuch as the obscuration band 2 and the coating-deposited black conductor 3 are positioned side-by-side.

In other words in this embodiment the coating-deposited black conductor 3 is bounded on at least one long side by a obscuration band 2 made of black nonconducting layer material and because of that the obscuration band is widened.

In the framework of our invention in this embodiment also the peripheral obscuration band 2 comprises a coating-deposited black conductor and is used to heat the window edges or as a heated strip for thermal glazing. The coating-deposited black conductor 3 in the vicinity of the window wiper unit has contacting devices or contacts 4. If the remaining peripheral obscuration band 2 is constructed as a coating-deposited black conductor, then its heating can be effected by branching current flow or by its own contacting devices or contacts with a spacer gap interposed.

The following Example describes the manufacture of a coating-deposited black conductor which has features which have proven particularly desirable when used in our invention and have a special significance:

Soluble phosphate, carbon black and a fine glittering or mica like pigment (graphite with a grain size less than 40 micrometers) are mixed intensively in an aqueous solution. The thus prepared solution contains then approximately the following solid components in dissolved or dispersed form (by weight):

Graphite: 67%, grain size less than 20 micrometers

Carbon black: 8%

$P_2O_5$: 21%

$Al_2O_3$: 4%.

The water content of the paint is adjusted so that the paint is satisfactorily imprinted with a standard screen-printing machine and a screen fabric 62 T. The paint used is like a standard decorative paint with an enamel base. The paint is applied with a screen-printing machine (web size 49 T) applied to the planar window and burned in (baked) in a laboratory oven at 630° C. for 4 minutes. The specific resistance p of the layer after burning in amounts to 0.023 ohm. One can attain a pearly glittering effect when one adds additionally pearly glittering pigment of that color.

In this embodiment plate-like pigments such as graphite and binding agents based on phosphate combine with each other. Surprisingly one obtains an adhesive mixture which can be applied as in screen-printing technology. The burning-in can also be effected during a bending or prestressing process. Surprisingly the breaking strength of the unit including the glass window and the burned-on layer is not impaired. The layer itself suffices in regard to all mechanical, chemical and electrical requirements.

In FIG. 4, the conductive black strip 3 is located within a recess or opening in the nonconductive black strip 2 of identical opacity, while in FIG. 5 the black conductive strip 3 is layered onto the nonconductive black strip 2.

We claim:

1. In a motor-vehicle window with an applied black obscuration band made of a layer of nonconducting material and with at least one electrically conducting element made of a conducting material located at and in contact with the obscuration band, the improvement wherein said electrically conducting element comprises a coating-deposited black conductor made from a conducting coating-deposited black material, said coating-deposited black conductor being flat and strip-like.

2. The improvement defined in claim 1 wherein said coating-deposited black conductor and said obscuration band are positioned side-by-side.

3. The improvement defined in claim 1 wherein the band constitutes an obscuration element and one of the elements is received in a recess in the other element.

4. The improvement defined in claim 1 wherein said opacifying obscuration band and said coating-deposited black conductor are each formed by a respective strip-like element one of which underlies the other.

5. In a window for a motor vehicle according to claim 1 wherein said window has a heatable window-wiper rest zone coinciding with the obscuration band, the wiper rest zone having an electric heating element, the improvement wherein
  said heating element comprises the electrically conductive coating deposited black conductor made from a conductive coating-deposited black material and which in said window-wiper rest zone is incorporated in said obscuration band.

6. The improvement according to claim 5 wherein said coating-deposited black conductor is provided at each end with at least one electrical contact.

7. The improvement according to claim 5 wherein said obscuration band frames said window and is connected to said coating-deposited black conductor at said window-wiper rest zone.

8. In a motor-vehicle window with an applied peripheral opacifying obscuration band made of a layer of black nonconducting material and with at least one electrically conducting element made of a conducting material located at and in contact with at least a portion of the obscuration band, the improvement wherein
  said electrically conducting element comprises a coating-deposited black conductor made from a conducting coating-deposited black material and forming at least part of said obscuration band, said coating-deposited black conductor and said obscuration band being formed as a single layer.

9. A motor vehicle window comprising:
  a glass pane having an outer edge; and
  a peripheral black obscuration band extending around the pane edge and leaving a central portion of the pane clear and unobstructed, the band being at least partially formed of a coating-deposited black conductor capable of generating heat when an electric current is passed through it, whereby an electrical current can be passed through the conductor to heat at least a portion of the pane at the obscuration band.

* * * * *